(12) United States Patent
Diabas

(10) Patent No.: US 11,491,673 B2
(45) Date of Patent: Nov. 8, 2022

(54) HAND-OPERATED VEGETABLE CUTTER APPLIANCE

(71) Applicant: SOCIETE D'ETUDES ET DE REALISATION MECANIQUES, Mortagne-sur-Sevre (FR)

(72) Inventor: Christian Diabas, Vertou (FR)

(73) Assignee: SOCIETE D'ETUDES ET DE REALISATION MECANIQUES, Mortagne-sur-Sevre (FR)

(*) Notice: Subject to any disclaimer, the term of this patent is extended or adjusted under 35 U.S.C. 154(b) by 115 days.

(21) Appl. No.: 16/776,121

(22) Filed: Jan. 29, 2020

(65) Prior Publication Data

US 2020/0238555 A1 Jul. 30, 2020

(30) Foreign Application Priority Data

Jan. 30, 2019 (FR) ...................................... 19 00885

(51) Int. Cl.
*B26D 3/26* (2006.01)
*A47J 43/24* (2006.01)
*B26D 1/553* (2006.01)
*B26D 3/18* (2006.01)
*B26D 7/06* (2006.01)
*B26D 7/27* (2006.01)
*B26D 7/00* (2006.01)

(52) U.S. Cl.
CPC ............... *B26D 3/26* (2013.01); *A47J 43/24* (2013.01); *B26D 1/553* (2013.01); *B26D 3/185* (2013.01); *B26D 7/0608* (2013.01); *B26D 7/27* (2013.01); *B26D 2007/0018* (2013.01); *B26D 2210/02* (2013.01)

(58) Field of Classification Search
CPC ...... B26D 3/26; B26D 1/5853; B26D 7/0608; B26D 2007/0018; B26D 2210/02; B26D 3/185; B26D 7/27; A47J 43/24
See application file for complete search history.

(56) References Cited

U.S. PATENT DOCUMENTS

| 925,693 A | 6/1909 | Goodykoontz | |
|---|---|---|---|
| 2,572,770 A * | 10/1951 | Shadduck | B26D 3/185 83/435.15 |
| 3,112,781 A * | 12/1963 | Popeil | A47J 19/00 83/435.15 |
| 5,337,480 A | 8/1994 | Codikow | |
| 2009/0193952 A1 | 8/2009 | Farid | |
| 2014/0338546 A1 * | 11/2014 | Repp | A47J 43/24 99/495 |

(Continued)

FOREIGN PATENT DOCUMENTS

JP 2017100250 A 6/2017

*Primary Examiner* — Omar Flores Sanchez
(74) *Attorney, Agent, or Firm* — Muncy, Geissler, Olds & Lowe, P.C.

(57) ABSTRACT

A hand-operated lettuce-cutting appliance with a chassis has a cutter grid and positioning device for positioning the chassis on at least one support. The appliance further includes a guide well having a bottom end extending adjacent to and facing said cutter grid and a vegetable-pusher device mounted to slide along at least one column fastened to the chassis so as to extend parallel to the well. The vegetable-pusher device has a body shaped so as to engage in the well in order to push the vegetable through the cutter grid.

12 Claims, 4 Drawing Sheets

(56) References Cited

U.S. PATENT DOCUMENTS

| | | | |
|---|---|---|---|
| 2016/0075043 A1* | 3/2016 | Cotter | B26D 7/0608 83/167 |
| 2018/0169880 A1 | 6/2018 | Whitney | |

* cited by examiner

HAND-OPERATED VEGETABLE CUTTER APPLIANCE

BACKGROUND OF THE INVENTION

In the culinary field, and in particular in the field of fast-food or collective catering, it is common practice to garnish dishes or food such as sandwiches with cut lettuce leaves. Usually, the leaves are removed one by one from a lettuce head and then cut up into fragments by hand using a knife. The lettuce leaf fragments are then washed and spun dry prior to being arranged, by way of example, in a sandwich, on a plate, or on a presentation dish. Those operations are both very time-consuming and also dangerous for the operator, who runs a major risk of getting cut while cutting the leaves with the knife.

It should be observed that hand-operated automatic vegetable-cutter appliances for cutting vegetables such as carrots, potatoes, tomatoes, etc., are unsuitable for cutting lettuces since they can present shapes and textures that are very different depending on the variety (e.g. very firm and spherical for iceberg lettuces, oblong in shape for chicory, or softer and flat for leaves of endive (escarole) or of Batavia . . . ). Also, lettuce is a vegetable that can neither be sliced, nor chopped, nor grated without degrading its appearance and taste.

Thus, in order to simplify the operation of cutting up lettuce leaves into fragments, hand-operated appliances have been developed that are known as "lettuce-cutters". Conventionally, those appliances are constituted by a chassis having engaged therein both a cutter grid and also a pusher lever for pushing the lettuce against the cutter grid. Thereafter, once the lettuce has gone through the cutter grid, lettuce leaf fragments are recovered, either directly from the worktop or else in a container placed under the lettuce-cutter. By way of example, mention may be made of the appliance described in Document US-A-2018/169880. The appliance comprises a cutter grid engaged in a chassis having four legs placed on the worktop, the appliance also having a lever arm for pushing the lettuce against the cutter grid. The lettuce is cut up as it passes through the grid, with the operator then recovering the leaf fragments thus obtained, either directly from the worktop, or else in a container. Thereafter, the operator needs to wash the lettuce leaf fragments and then spin them dry, adding additional operations that take up time and that might damage the preparation.

Also, using appliances of this type continues to present dangers for the operator. Although the operator is no longer using a knife, the operator needs to place the lettuce head directly on the cutter grid and then to actuate the lever arm in order to push the lettuce through the grid. In order to ensure that this pushing operation is properly performed, it is essential for the lettuce head to be stationary on the grid, which does not always happen under the pressure from the lever arm and given the shape and the texture of the lettuce head. The operator is thus tempted to stabilize the lettuce head on the grid by holding it with one hand, while actuating the lever arm with the other hand, thereby running significant risks of the hand holding the lettuce being crushed or cut, and all the more so when a large number of lettuces are to be prepared in a short length of time, as applies in particular with fast-food catering.

OBJECT OF THE INVENTION

An object of the invention is to provide means for cutting lettuce that limit the risk of injuring the operator.

SUMMARY OF THE INVENTION

To this end, the invention provides a hand-operated lettuce-cutter appliance comprising a chassis provided with a cutter grid and positioning means for positioning said chassis on at least one support. Said appliance further comprises a guide well having a bottom end that extends adjacent to and facing said cutter grid, and a vegetable-pusher device mounted to slide along at least one column fastened to the chassis so as to extend parallel to the well. The vegetable-pusher device comprises a body shaped in such a manner as to engage in the well in order to push the vegetable through the cutter grid.

Thus, the lettuce for cutting is placed inside the guide well and it is held therein by the sides of the well while it is being pressed against the cutter grid by the vegetable-pusher device. Not only does the operator no longer have any need to hold the lettuce while it is being cut, but the operator can no longer make use of a hand to hold the lettuce for cutting against the grid.

Advantageously, the vegetable-pusher device of the appliance is arranged slide only when substantially identical downward forces are exerted on said device.

Not only is it awkward to insert a hand in the guide well, but it is also difficult to use only one hand to exert substantially identical downward forces on the vegetable-pusher device. In order to operate the appliance properly, the operator is thus constrained to insert the lettuce into the guide well and to actuate the vegetable-pusher device with both hands, thereby eliminating any risk of crushing or cutting a hand.

Preferably, the vegetable-pusher device includes at least two handles, said handles being arranged on either side of the body of said vegetable-pusher device.

Advantageously, the vegetable-pusher device slides along at least two columns extending parallel to the well on either side thereof.

Also advantageously, the bottom face of the body of the vegetable-pusher device that comes into contact with the vegetable for cutting is provided with portions in relief that are complementary to the grid.

Preferably, the cutter grid and/or the guide well of the hand-operated lettuce-cutting appliance is/are removable.

Also preferably, the positioning means of the hand-operated lettuce-cutting appliance of the invention are shaped in such a manner as to receive the edges of a container and/or to be placed directly on a worktop.

Advantageously, the positioning means comprise a groove suitable for engaging on an edge of a container.

Also advantageously, the positioning means are optionally-removable legs, and preferably the positioning means are legs that are removable.

In a particular embodiment of the invention, the positioning means are constituted both by at least one groove suitable for receiving the edges of a container and also by optionally-removable legs arranged to bear on a worktop.

In accordance with the invention, there is also provided an assembly for preparing a vegetable, the assembly comprising a vegetable spinner and a hand-operated appliance of the invention, said vegetable spinner comprising a container having a spinner basket rotatably mounted therein and said appliance having positioning means arranged to bear on a top edge of said container.

Advantageously, the positioning means comprise a groove suitable for engaging on an edge of a container.

Other characteristics and advantages of the invention appear on reading the following description of a preferred, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
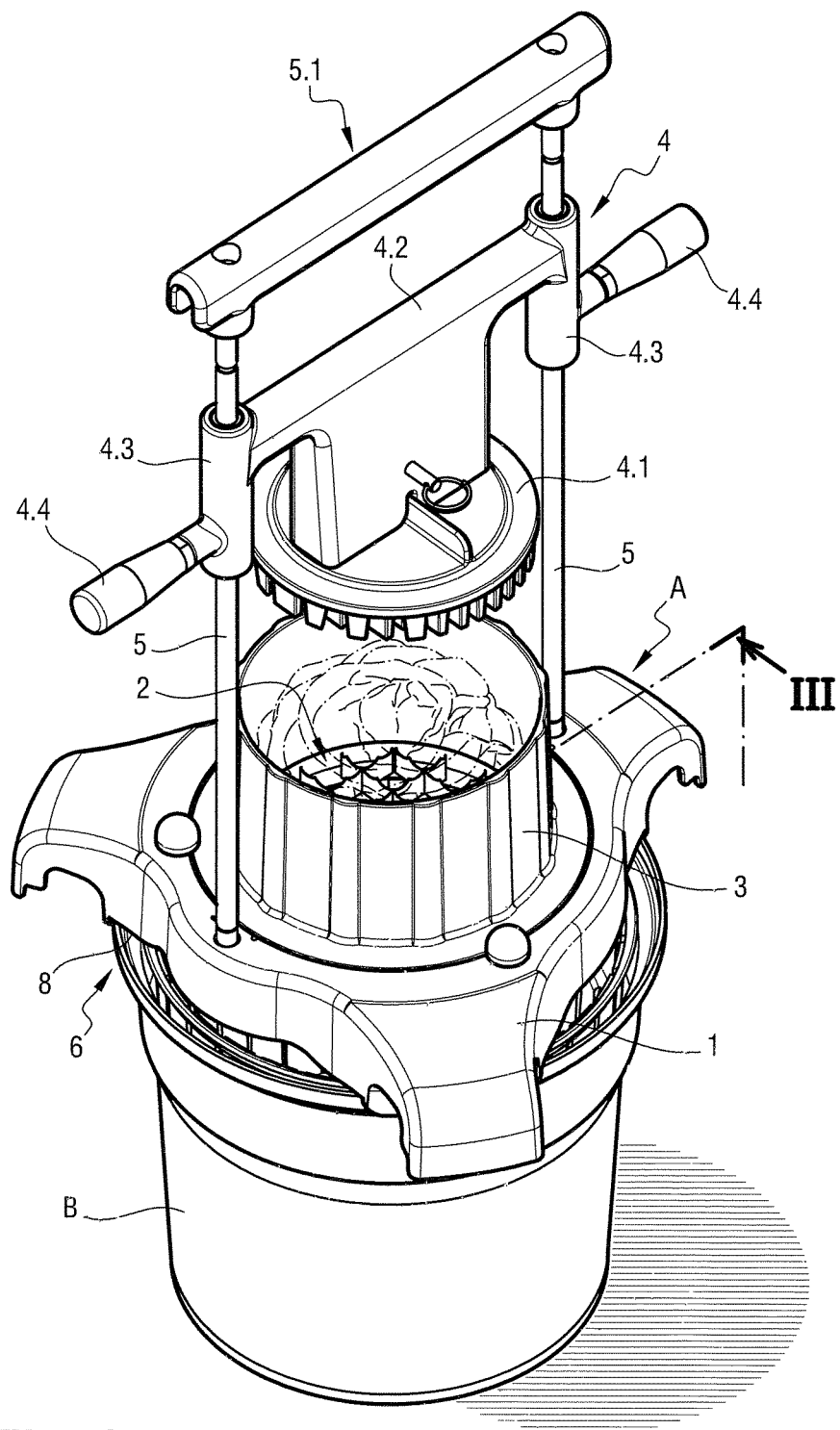
FIG. 1 is a diagrammatic perspective view of the assembly of the invention in position on a container and with its vegetable-pusher device in the high position.

With reference to FIGS. 1 to 4, the invention relates to a hand-operated appliance for cutting lettuce.

The hand-operated appliance A comprises a chassis 1 provided with a cutter grid 2. In this example, the chassis 1 is made as an aluminum casting and it is substantially triangular in shape. An opening is provided in the center of the chassis 1, and a cutter grid 2 is fastened in said opening.

Preferably, the cutter grid 2 has cutter blades arranged in such a manner as to form a rectangular grid suitable for cutting a lettuce to the desired size. The person skilled in the art knows how to determine the area needed for the cutter grid 2 and the size of the mesh as a function of the size of the leaf fragments that it is desired to obtain. In conventional manner, the cutter grid 2 in this example presents a mesh of about 25 millimeters (mm)×25 mm. In preferred manner, the cutter grid 2 is fastened on the chassis 1 in releasable manner and the appliance has a plurality of cutter grades 2 with meshes of different sizes, each of which can be mounted on its own on the chassis 1. Having the cutter grid 2 fastened in removable manner also serves to facilitate cleaning.

The appliance of the invention also comprises a guide well 3 that is open at both ends. The bottom end of the guide well 3 is adjacent to and faces said cutter grid. More precisely, the bottom end of the guide well 3 extends around the cutter grid 2 and is releasably fastened to a top face of the chassis 1. In this example, the bottom end includes an outer rim engaged under abutments projecting from the top face of the chassis 1. The top end of the guide well 3 is also open. The person skilled in the art knows how to define the shape and the size of the top end of the guide well 3 so as to ensure that it is easy to place any type of lettuce therein, regardless of its shape and size. The person skilled in the art also knows how to determine the height of the guide well 3 so as to make it awkward for an operator to put a hand into it. In this example, the guide well 3 is in the shape of a tube having a height of 115 mm, with both ends being identical and circular in shape with a diameter of 174 mm.

In accordance with the invention, the appliance also comprises a vegetable-pusher device 4 mounted to slide along at least one column 5 that is fastened to the chassis 1 so that it extends parallel to the guide well 3. In this example, the vegetable-pusher device 4 is slidably mounted on two columns 5, as shown in FIGS. 1 to 4.

In this example, the columns 5 are made of metal, e.g. a stainless steel, and they are fastened on the top face of the chassis 1 on either side of the guide well 3 at positions that are diametrically opposite each other. The height of the columns 5 is determined in such a manner that the vegetable-pusher device 4 can have a high position in which the vegetable-pusher device 4 extends over the top end of the guide well 3, while leaving a passage relative thereto that is of a height that is sufficient to enable the operator to insert the vegetable for preparing into the guide well 3 through its top end. The vegetable-pusher device 4 also has a low position, as shown more particularly in FIG. 2, in which the vegetable-pusher device 4 bears against the cutter grid 2. In order to increase the strength of the columns 5 while the vegetable-pusher device 4 is being moved between its two positions, and in particular in order to avoid any phenomenon of the columns 5 bending, the columns are connected together at their top ends by a crossmember 5.1 having two ends, each of which is provided with a hole for receiving the top end of a respective one of the columns 5. This crossmember 5.1 is removable and allows the vegetable-pusher device 4 to be removed completely, e.g. for cleaning.

The vegetable-pusher device 4 comprises a body 4.1 that is shaped in such a manner that it engages in the guide well 3 in order to push the vegetable through the cutter grid 2, which body is surmounted by a support 4.2. In this example, the body 4.1 is of a circular shape that is identical to the shape of the guide well 3, and of outside diameter that is slightly smaller than the inside diameter of the guide well 3. The body 4.1 is made of a hard material that is suitable for contacting food, and that may be a plastics material or stainless steel, for example. In preferred manner, the bottom face of the body 4.1 of the vegetable-pusher device that comes into contact with the vegetable for cutting is provided with portions in relief that are complementary to the cutter grid 2. The portions in relief made in this way serve to press the vegetable in uniform manner against the cutter grid 2 so as to cause it to pass right through the cutter grid 2.

The body 4.1 of the vegetable-pusher device 4 is releasably fastened to the center of the support 4.2. The support 4.2 is substantially in the shape of a bridge extending between the two columns 5 and having ends that are mounted to slide along the columns 5. In this example, the support 4.2 has two ends, each of which is provided with a tubular sleeve 4.3 in which a respective one of the columns 5 is slidably engaged. As a safety measure, the high position of the vegetable-pusher device 4 can be held by a retractable locking system such as a ball held by the support 4.2. In other words, when no force is exerted on the vegetable-pusher device 4, it remains in the position in which it is to be found.

In preferred manner, at each of its ends, the support 4.2 has a lateral handle 4.4 extending perpendicularly to the columns 5 and lengthening the support 4.2. The operator can thus place two hands on respective ones of the handles 4.4 on either side of the support 4.2 and thus of the body 4.1, and can thus exert substantially identical downward forces on each of the handles 4.4. In preferred manner, the columns 5 and the vegetable-porter device 4 are assembled together in such a way that if the forces exerted on each of the handles 4.4 are not substantially identical, e.g. if the operator makes use of only one of the handles 4.4, then the support 4.2 tends to tilt relative to the columns 5, thereby giving rise to a jamming phenomenon that prevents the vegetable-pusher device 4 from moving by preventing it from sliding along the columns 5. In order to operate the lettuce-cutter appliance properly, the operator is thus constrained to use both hands to exert substantially equal forces on each of the handles 4.4 of the vegetable-cutter device 4, thereby limiting any risk of crushing a hand. Also, in preferred manner, when in the high position, the support 4.2 is adjacent to the crossmember 5.1, thereby constraining the operator to make use of the handles 4.4 in order to operate the vegetable-pusher device 4, and thus constraining the operator to use both hands.

Once the lettuce has been cut, the vegetable-pusher device 4 is moved up from the low position to the high position by exerting substantially identical upward forces.

The appliance of the invention further comprises positioning means 6 for positioning the chassis 1 on at least one support. With reference to FIG. 1, the positioning means 6 are shaped in such a manner as to receive the edges of a container B. In this example, the bottom face of the chassis 1 includes a groove 8 that is shaped so as to fit at least in part over the edges of the container B. The person skilled in the art knows how to adapt the width and the depth of the groove so that the appliance and the container B are keyed together, in particular while operating the vegetable-pusher device 4. The container B maybe a bowl or some other vessel for recovering the lettuce leaf fragments. In advantageous manner, the container B is part of a vegetable spinner, and is rotatably receives a spinner basket. Thus, the operator takes the lettuce-cutter appliance with the vegetable-pusher device 4 in its high position and places it on the container B of the spinner in such a manner that the edge of the spinner penetrates into the groove 8 formed in the bottom face of the chassis 1. Thereafter, the operator puts the vegetable for cutting, e.g. a lettuce head, into the guide well 3 and then puts two hands on respective handles 4.4 on either side of the vegetable-pusher device 4 and uses them to exert substantially identical downward forces until the vegetable-pusher device 4 pushes the lettuce against the cutter grid 2, which then cuts the leaves into fragments. The leaf fragments drop directly into the rotary basket of the spinner. The operator can thus quickly finish off preparing the lettuce and the garnishing for the dish or the food, without risk and with limited handling.

Figure 2:
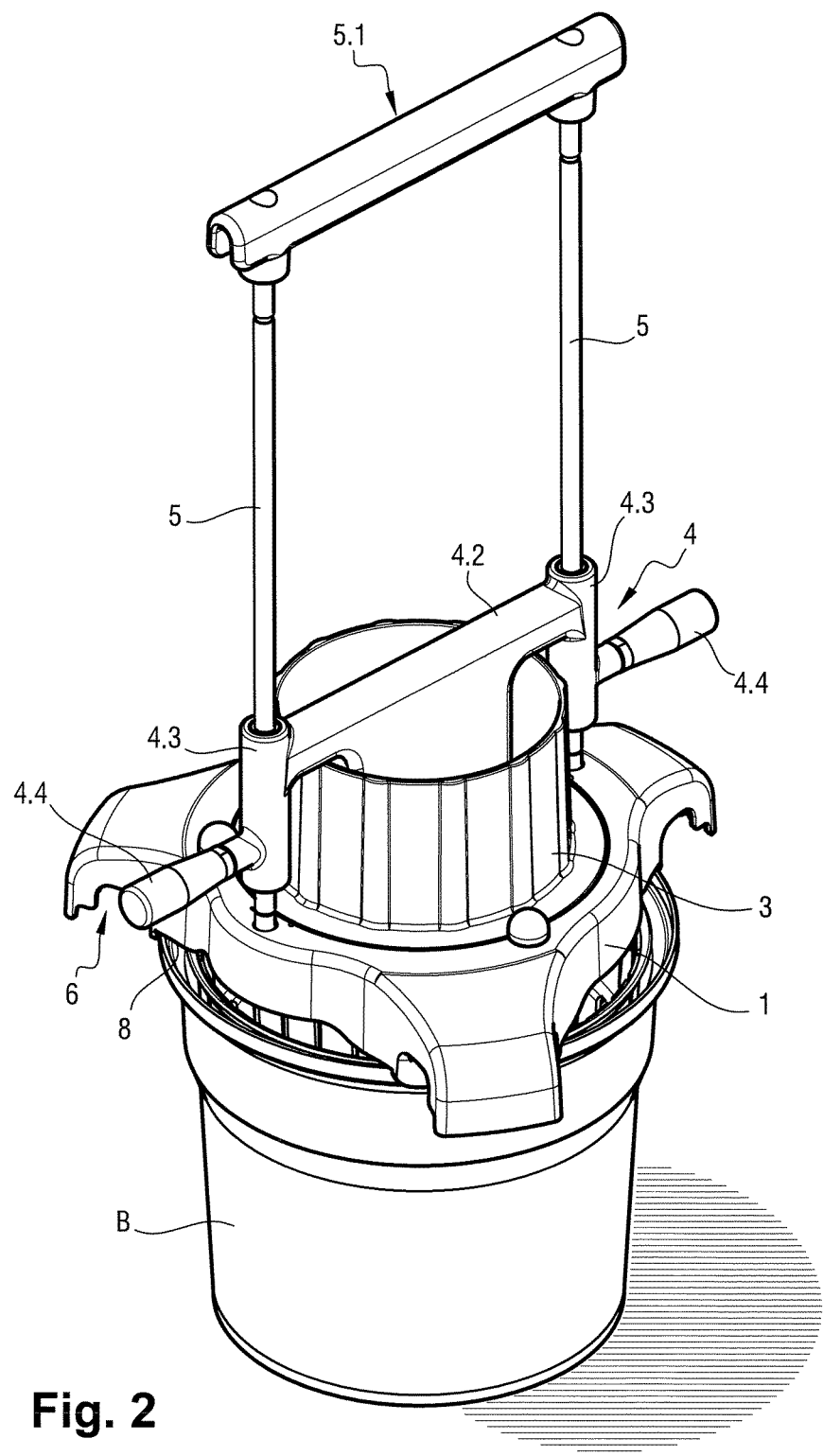
FIG. 2 is a diagrammatic perspective view of the assembly of the invention in position on a container with its vegetable-pusher device in the low position, i.e. against the grid.
Figure 3:
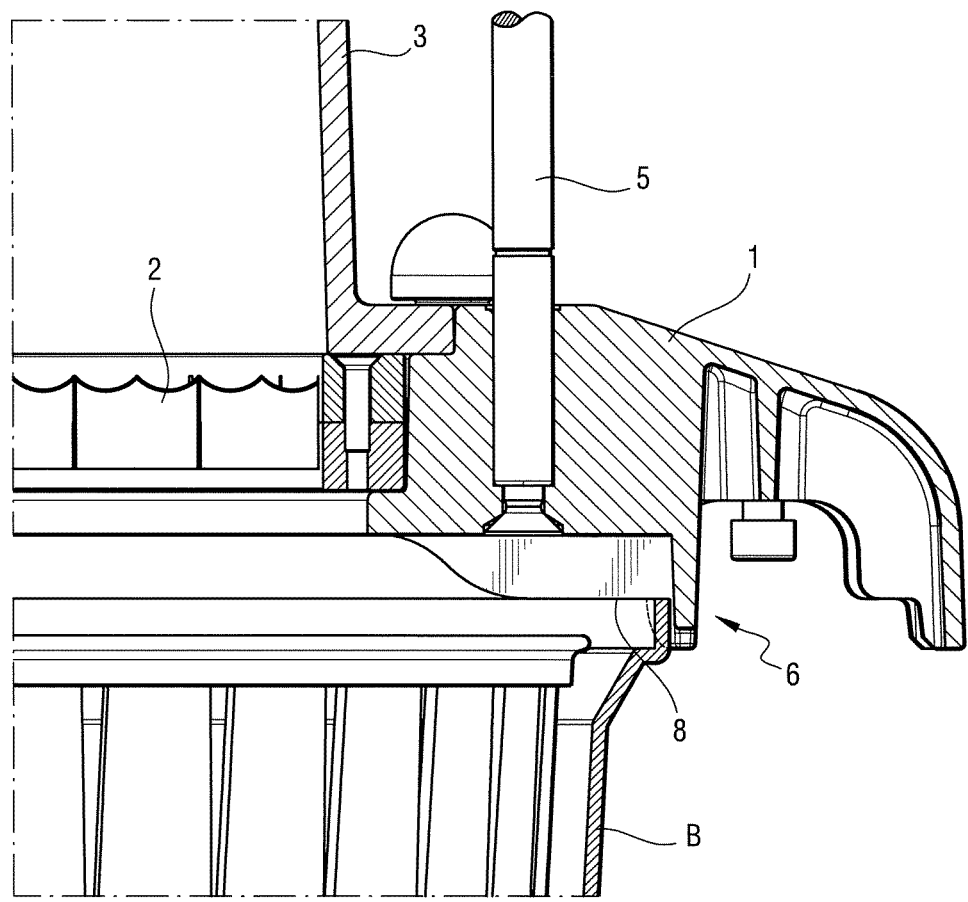
FIG. 3 is a diagrammatic section view of the assembly of the invention in position on a container with its vegetable-pusher device in the high position.

Thus, and as shown in FIGS. 1 to 3, the present invention also provides the vegetable-processing assembly comprising the vegetable spinner together with the lettuce-cutter appliance.

Figure 4:
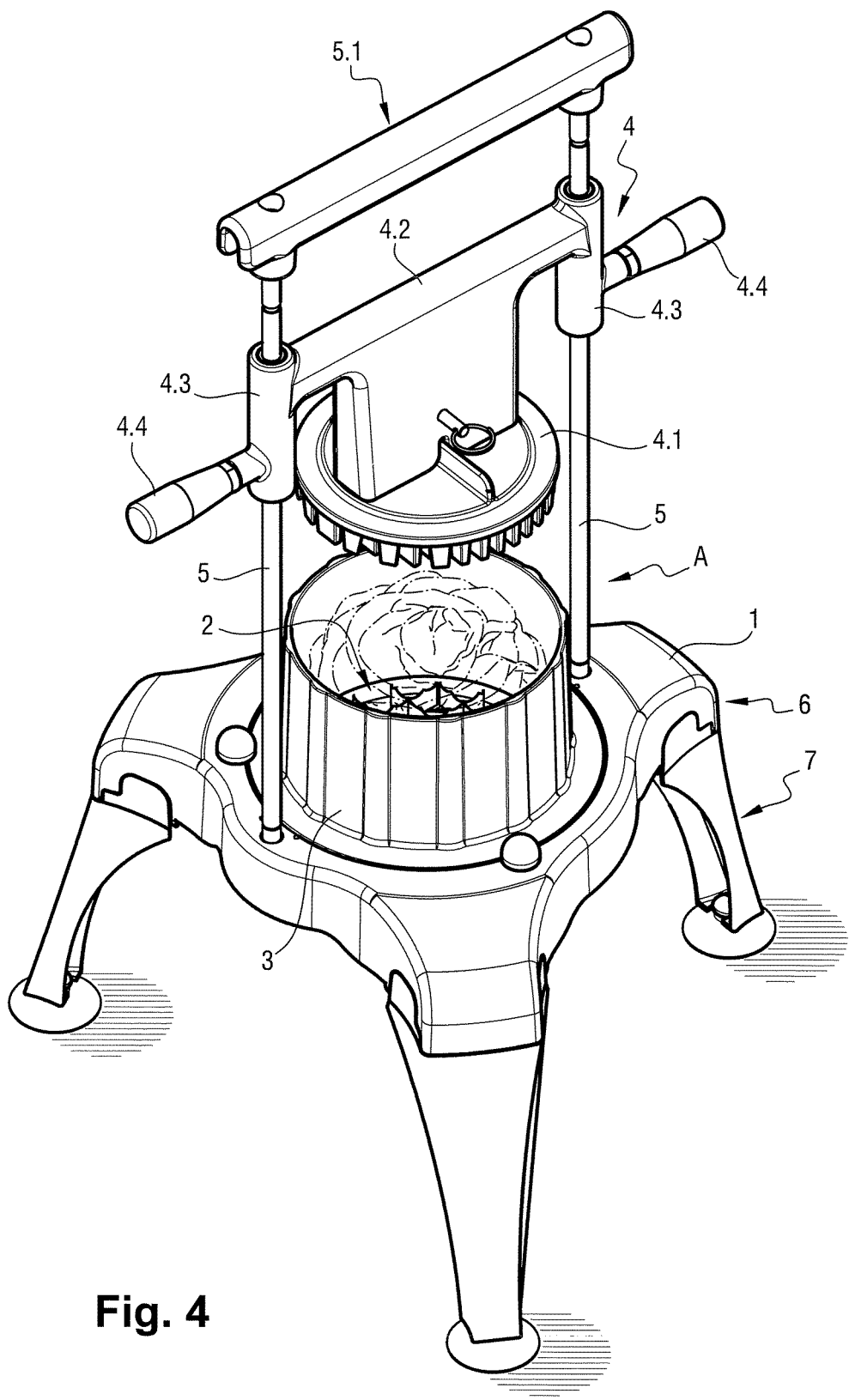
FIG. 4 is a diagrammatic perspective view of a lettuce-cutter appliance of the invention and including legs for placing on a worktop.

In an alternative embodiment, as shown in FIG. 4, the invention provides a lettuce-cutter appliance as described above in which the positioning means 6 are optionally-removable legs 7. In a particular embodiment of the invention, there are three legs 7 fastened to the bottom face of the chassis 1 at each of the corners of the triangle constituted by said chassis 1. In this example, the legs 7 are fastened to the chassis 1 by mutually engaging two complementary shapes, one of them, the male portion, being present at the top end of each leg 6, and the other one, the female portion, being provided in the bottom face of the chassis 1, the male portion of the leg 7 becoming engaged in the female portion of the chassis 1. The opposite ends of the legs 7 are placed directly on the worktop. In advantageous manner, each leg may be provided with a suction-cup foot so as to strengthen the attachment of the lettuce-cutter appliance to the worktop and strengthen its stability while it is in operation. The person skilled in the art knows how to find means for fastening the legs 7 to the worktop, should that be necessary for providing the lettuce-cutter appliance with stability while it is in use. For example, the ends of the legs placed on the worktop could be fitted with tabs that are screwed directly to the worktop.

In a third variant of the invention, the lettuce-cutter appliance has positioning means 6 that are constituted both by at least one groove 8 suitable for receiving the edges of a container, and also by optionally-removable legs 7 that are arranged to bear on a worktop, as described above. In a preferred embodiment of the invention, the legs 7 of the lettuce-cutter appliance are removable. Thus, depending on requirements, the operator can either remove the legs and place the lettuce-cutter appliance A directly on a container B, or else make use of the legs 7 and place the lettuce-cutter appliance A on the worktop, e.g. placing a dish underneath it in order to recover the leaf fragments.

Naturally, the invention is not limited to the embodiment described, but covers any variant coming within the ambit of the invention as defined by the claims.

In particular, the cutter grid 2 could equally well be made using metal wires that are tensioned sufficiently to enable vegetable leaves to be cut by said wires when the leaves are pressed against them by the vegetable-pusher device.

As described herein, the guide well is cylindrical, however it could equally well have some other shape: cubic, rectangular-box shape, frustoconical, etc. so that the bottom end of the well is substantially covered by the cutter grid and so that the body of the vegetable-pusher device can be engaged in the well through its top end.

The guide well 3 may be fastened to the chassis 1 by any other means, and this may be done permanently, or preferably in releasable manner. The person skilled in the art knows how to use the most appropriate fastener means, and thus, and by way of example, the guide well 3 may be screwed to the chassis 1, however it could also be fastened to the chassis 1 by flanges or by mutually engaging at least one pair of two complementary parts, one on the chassis 1 and the other on the bottom end of the guide well 3, or by sliding a rail in a slot. The bottom end of the guide well 3 preferably extends around the cutter grid 2. In a variant, the bottom end of the guide well 3 has a cross section that is smaller than the area of the cutter grid 2. Specifically, the smaller the space between the periphery of the cutter grid 2 and the inside of the bottom end of the guide well 3, the greater the extent to which the vegetable is cut up completely.

The cutter grid 2 and the guide well 3 may be secured to each other, with the resulting assembly being removably fitted on the chassis 1.

In particular, as described herein, the vegetable-pusher device is moved from its low position against the cutter grid to its high position remote therefrom by hand, however it could be moved automatically, e.g. by using a spring that is stretched when the vegetable-pusher device is in its low position and compressed when the vegetable-pusher device is in its high position.

In particular, as described herein, the means for positioning the container are formed by a groove in the bottom face of the chassis, however they could equally well be clamps or clips, or positioning could be performed by inserting lugs in holes provided for this purpose, or by male and female parts.

In particular, in a second variant of the invention, the positioning means described are formed by three legs, as is necessary to provide the lettuce-cutter appliance with stability, however the positioning means could be constituted by four or more legs so long as the lettuce-cutter appliance is stable in operation.

Each leg may have a plane bottom surface with a groove formed therein so as to allow the legs either to rest on a worktop via their bottom surfaces or else on the edge of a container via the bottoms of the grooves.

In the present specification, the terms "vegetable" and "lettuce" are used to cover any vegetable having leaves that are eaten. By way of example, mention may be made of lettuces (endives, chicories, escaroles, frisées, Boston, Batavia, iceberg, oak leaf . . . ) and also of other vegetables such as spinach, beet leaves, cabbages . . . .

The invention claimed is:

1. A hand-operated lettuce-cutting appliance comprising:
a chassis provided with a cutter grid having a plane upper face;
positioning means for positioning the chassis on at least one support;
a guide well having a bottom end extending adjacent to the upper face of the cutter grid and an upper end extending away from the upper face of the cutter grid; and
a vegetable-pusher device mounted to slide along at least two columns fastened to the chassis so as to extend parallel to the guide well on either side thereof, said vegetable-pusher device comprising a body shaped so as to engage in the guide well in order to push the vegetable through the cutter grid, said vegetable-pusher device includes a support with at each end a lateral handle that extends perpendicularly to the columns and that are each arranged to be grasped by a hand of the user, and that the said columns and the vegetable-pusher device are assembled together in such a way that if the forces exerted on each of the handles by each hand are not identical then the support tends to tilt relative to the columns preventing it from sliding along the columns.

2. The appliance according to claim 1, wherein the bottom face of the body of the vegetable-pusher device that comes into contact with the vegetable for cutting is provided with portions in relief that are complementary to the cutter grid.

3. The appliance according to claim 1, wherein at least one of the cutter grid and the guide well are removable.

4. The appliance according to claim 1, wherein the positioning means are shaped in such a manner as to receive the edges of a container and/or to be placed directly on a worktop.

5. The appliance according to claim 4, wherein the positioning means comprise a groove suitable for engaging on an edge of a container.

6. The appliance according to claim 4, wherein the positioning means are optionally-removable legs.

7. The appliance according to claim 4, wherein the positioning means are removable legs.

8. The appliance according to claim 1, wherein the positioning means are constituted both by at least one groove suitable for receiving the edges of a container and also by optionally-removable legs arranged to bear on a worktop.

9. The appliance according to claim 1, wherein the bottom end of the guide well extends around the cutter grid.

10. An assembly for preparing a vegetable, the assembly comprising a vegetable spinner and an appliance according to claim 1, the vegetable spinner comprising a container having a spinner basket rotatably mounted therein and the appliance having positioning means arranged to bear on a top edge of the container.

11. The assembly according to claim 10, wherein the positioning means comprise a groove suitable for engaging on an edge of a container.

12. The appliance according to claim 1, wherein the columns have parallel longitudinal axes extending in a same plane and the handles extends parallel with said plane.

* * * * *